United States Patent [19]

Eckstein et al.

[11] 4,384,811
[45] May 24, 1983

[54] APPARATUS FOR CENTERING AND INDEXING OF MACHINE TOOL PARTS, IN PARTICULAR ANGLE MILLING HEADS ON THE SPINDLE CARRIAGE OF A MILLING MACHINE

[75] Inventors: Rolf Eckstein, Rödental; Horst Schramm, Ahorn, both of Fed. Rep. of Germany

[73] Assignee: Werkzeugmaschinenfabrik Adolf Waldrich Coburg GmbH & Co., Coburg, Fed. Rep. of Germany

[21] Appl. No.: 212,670

[22] Filed: Dec. 3, 1980

[30] Foreign Application Priority Data

Dec. 11, 1979 [DE]  Fed. Rep. of Germany ... 7934741[U]

[51] Int. Cl.³ .......................... B23C 1/02; B23Q 3/12
[52] U.S. Cl. ........................ 409/215; 279/4; 408/239 R; 409/230
[58] Field of Search ............... 409/144, 218, 230, 231, 409/232, 233, 234, 215; 408/239, 239 A, 240; 279/4

[56] References Cited

U.S. PATENT DOCUMENTS 3,587,389  6/1971  Kreimer ........................ 409/144 X
3,851,364  12/1974  Noa et al. ...................... 409/231 X

*Primary Examiner*—Z. R. Bilinsky
*Attorney, Agent, or Firm*—Flynn, Thiel, Boutell & Tanis

[57] ABSTRACT

An apparatus for centering and indexing of milling machine parts, in particular angle milling heads on a spindle carriage of a milling machine. Cooperating indexing elements are arranged on the angle milling head and on the spindle carriage, which elements are simultaneously also the centering elements. These are constructed as four similarly constructed aligning units which are arranged offset to one another each at 90° in peripheral direction. Each aligning unit consists of an aligning tab arranged on the one milling machine part, preferably the angle milling head and a fixing piece provided on the other milling machine part and has a groove therein. The angle milling head can be fixed in predetermined angular positions relative to the spindle carriage through the aligning units.

4 Claims, 5 Drawing Figures

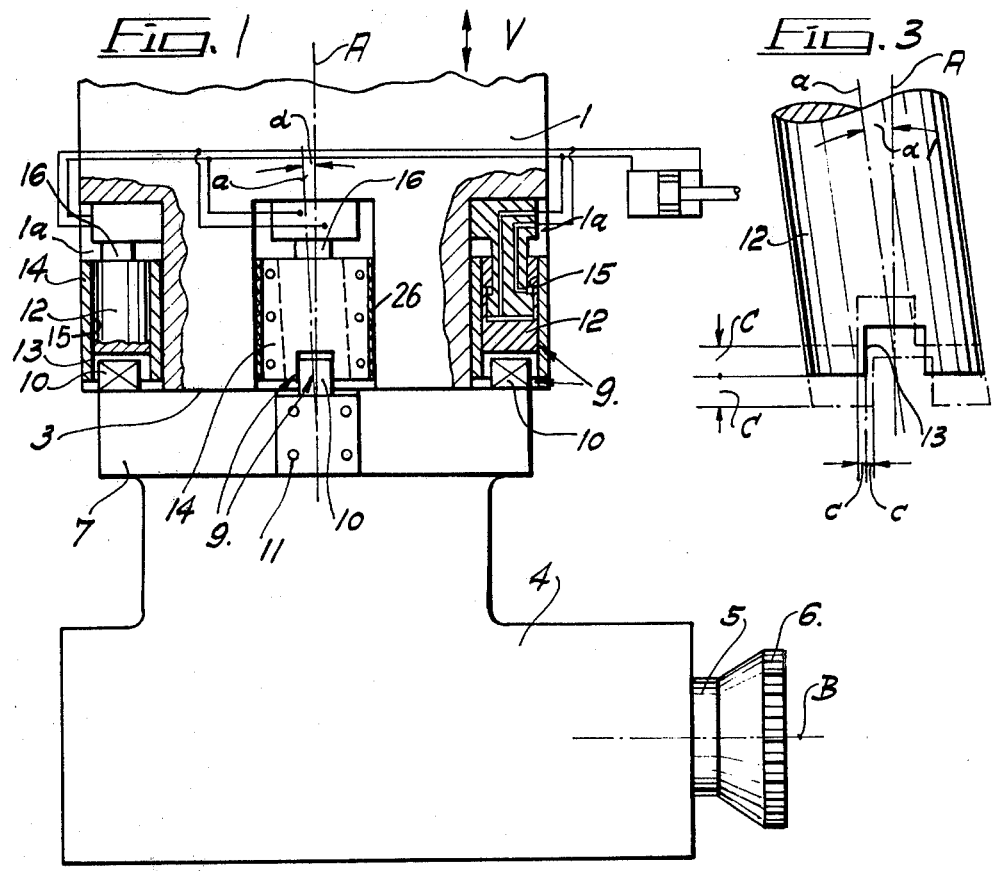
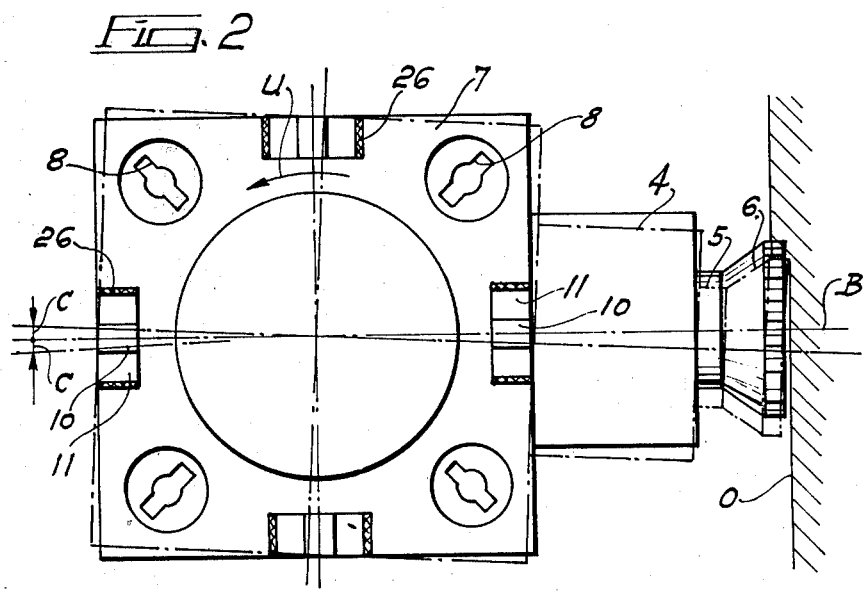

APPARATUS FOR CENTERING AND INDEXING OF MACHINE TOOL PARTS, IN PARTICULAR ANGLE MILLING HEADS ON THE SPINDLE CARRIAGE OF A MILLING MACHINE

FIELD OF THE INVENTION

The invention relates to an apparatus for centering and indexing of milling machine parts, in particular angle milling heads on the spindle carriage of a milling machine.

BACKGROUND OF THE INVENTION

In a conventional apparatus of this type for centering of the angle milling head relative to the spindle which is supported in the spindle carriage there is provided a centering ring on one of two machine parts engaging a centering opening on the other machine part. In order that at temperature differences of both machine parts the centering ring always fits into the centering opening, a suitable clearance must exist. However, this clearance has disadvantageous effects on the machining precision of the machine.

In a different and known apparatus for centering and indexing an angle milling head with respect to the spindle carriage of a milling machine (compare German Pat. No. 2 045 604 which corresponds to U.S. Pat. No. 3,757,637), a centering ring is arranged for centering the angle milling head on the head. This centering ring works together with four ball roller elements which are arranged offset at 90° in the spindle carriage. Such a ball roller element consists of a large main ball and several small balls, which are arranged in a ball sleeve. The main ball lies hereby on a ball bed of small balls, which can run around the entire surface of a hardened ball pan made of steel, which ball pan is constructed in the form of a saucer. The ball roller elements are radially fitted into the spindle carriage so that the main balls rest also in the case of a warm spindle carriage and cold angle milling head with a certain pretension on the centering ring. In this conventional apparatus, the centering ring must be hardened, which results in certain problems since the centering ring can easily warp during hardening. Furthermore the exact fitting of the ball roller elements into the spindle carriage requires a considerable amount of work input. The indexing is donw in this conventional apparatus by providing on the fastening flange of the angle milling head four shoulders which are offset at 90° with respect to one another, which shoulders have indexing surfaces. Each one of the shoulders can be clamped between two stops which are arranged on the spindle carriage. One of the stops has several stop surfaces which are offset to one another, through which the angular position of the angle milling head can be changed with respect to the spindle carriage and thus the so-called camber of the milling tool can be adjusted. However, the transmission of the milling forces through only one shoulder is insufficient.

The basic purpose of the invention is to provide an apparatus for centering and indexing of machine tool parts, in particular angle milling heads on the spindle carriage of a milling machine of the abovementioned type, which is distinguished by a simple construction, high aligning exactness, temperature independency and good transmission of the milling forces. In a further development of the invention a change in the camber in the built-in condition of the angle milling head is thereby also possible and the angle milling heads and other additional aggregates of various machines are exchangeable among one another.

The basic purpose of the invention is attained according to the invention by the indexing elements being simultaneously also the centering elements and being constructed as four similarly constructed aligning units which are arranged offset to one another each at 90° in peripheral direction, of which each consists of an aligning tab arranged on one milling machine part, preferably the angle milling head, and a fixing piece which is provided on the other milling machine part and has a groove.

Thus the new apparatus does not need a centering ring and the indexing elements are simultaneously also used for centering the angle milling head with respect to the spindle carriage. This makes the apparatus simpler in structure, wherein simultaneously the aligning exactness is increased totally independently from the temperature differences of both milling machine parts. Temperature differences can thus no longer have an effect since the temperature differences lead only to a relative movement of the aligning tabs with respect to the grooves in radial direction and not in peripheral direction. Since in each case four annular tabs are offset to one another at 90° engage in corresponding grooves of the four fixing pieces, which grooves extend radially relative to the spindle and which are arranged also offset to one another at 90°, the center centering is always maintained, even when the annular tabs move in the grooves of the fixing pieces. Since the milling forces of a total of four aligning tabs are transmitted onto the fixing pieces which are secured in the spindle carriage, high milling forces also are absorbed alone through the form locking between the aligning elements. Also, a sample pretension of the fastening flange on the angle milling head with respect to the spindle carriage enables high milling forces to be satisfactorily transmitted. Moreover, the inventive apparatus has also the advantage that it permits the fully automatic attaching and indexing of the angle milling head on the spindle carriage.

In order to achieve optimum cutting conditions and surface quality and also to balance a certain resiliency of the angle milling head on the milling spindle, often a so-called camber adjustment is desired. The term "camber" means a slight incline of the milling tool axis with respect to the workpiece surface. The camber adjustment must be reversible depending on the running direction of the table. In order to make possible in the inventive apparatus also a camber adjustment, preferably each of the four fixing pieces is constructed as a slide member which is movable in a housing fastened in a recess in the spindle carriage along guideways which are slightly inclined in peripheral direction with respect to the spindle axis, wherein for the simultaneous adjustment of all four slide members at equally large paths of adjustment, an adjusting mechanism engages each slide member and the four adjusting mechanisms are coupled with one another. Of course, the guideways of all four slide members are hereby inclined in the same direction in peripheral direction with respect to the spindle axis. The inclination can thereby be kept very small and in increments for example to 1:100. If now all four slide members are moved simultaneously in axial direction at a certain distance, then from this results also a movement in peripheral direction with respect to the spindle. However, this movement in peripheral direction amounts only to one hundredth of the movement in the axial direction. Depending on whether the slide member is moved upwardly or downwardly, with this a camber adjustment in the one or the other direction can be carried out. Of course, this camber adjustment is only possible when the clamping mechanism between the angle milling head and spindle carriage is released.

Each slide member is preferably constructed cylindrically and the guideway in the housing is formed by an opening, the axis of which is slightly inclined in peripheral direction with respect to the spindle axis. Through the cylindrical construction of the slide members, edge pressures are avoided even during the highest load caused by the milling forces.

The fixing pieces must be aligned directly on the spindle carriage during the mounting. To achieve this, an aligning plate is provided preferably for aligning the fixing pieces, which aligning plate has four annular tabs which are offset 90° to one another and fit into the fixing pieces, a centering opening which fits onto the free spindle end and an aligning surface which is arranged parallel with respect to the centering opening axis and parallel to a diameter which extends through two diametrically opposite aligning tabs. By means of the aligning plate, the function of which will be described in greater detail later on, it is possible to aling the fixing pieces very exactly with respect to the spindle carriage and to secure same to the aligning plate. One can also use the same angle milling head with the same degree of exactness on a different machine and also other additional aggregates can be secured to most of the various machines having a high precision alignment capability.

Further advantageous developments of the invention are characterized in the remaining subclaims.

BRIEF DESCRIPTION OF THE DRAWINGS

The invention will be discussed in greater detail hereinafter with reference to one exemplary embodiment which is illustrated in the drawings, in which:

FIG. 1 is a partially sectioned side view of the new apparatus;

FIG. 2 is a top view of the angle milling head;

FIG. 3 is a side view of a slide member;

DETAILED DESCRIPTION

Figure 4:
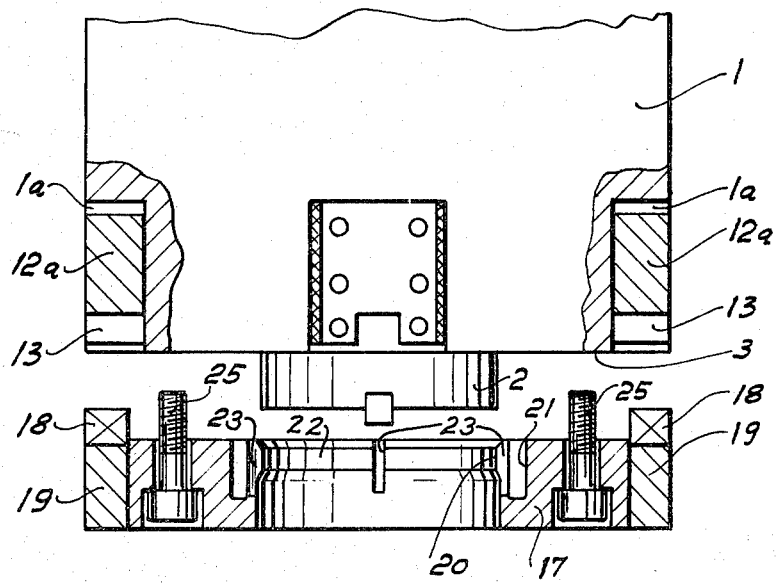
FIG. 4 is a partially sectioned view of an aligning plate and the spindle carriage which is arranged thereabove.

A spindle carriage 1 is identified by the reference numeral 1 in the drawings, which carriage can be reciprocally moved in the direction V on a not illustrated support structure of a milling machine. A not fully illustrated milling spindle is rotatably supported in the spindle carriage, the axis of which is identified by the letter A in FIG. 1. The lower end 2 of the milling spindle is illustrated in FIG. 4 and projects beyond the front surface 3 of the spindle carriage. A further milling spindle 5 is rotatably supported about the axis B in the angle milling head 4, which milling spindle is designed at its free end to receive a milling tool 6. The angle milling head 4 has a fastening flange 7 secured thereto. Four clamping bolts which are not illustrated and which are offset at 90° to one another are supported for movement parallel with respect to the axis A and rotatably about their own axes in the spindle carriage 1. These clamping bolts have at their lower ends T-shaped heads which are received in recesses 8 on the fastening flange 7 and can be locked therein by a rotation thereof. More specifically, the recesses 8 have an undercut (not shown) to facilitate the reception of the T-shaped head on the clamping bolts. The clamping bolts make it possible for the fastening flange 7 to be clamped to the front surface 3 of the spindle carriage. The clamping, releasing and rotating of the clamping bolts occur automatically by hydraulic or pneumatic means not forming a part of this invention. The angle milling head 4 must be centered exactly with respect to the axis A of the spindle, wherein furthermore the angle milling head 4 must also be capable of being indexed at predetermined angular positions relative to the spindle carriage, which angular positions are offset at 90° to one another. Four similarly designed aligning units 9 which are each arranged offset at 90° in peripheral direction to one another are provided for this purpose. Each of these aligning units consists of an aligning tab 10 which forms a part of a holding plate 11. Furthermore each aligning unit 9 includes a fixing piece 12 having a downwardly open groove 13 into which is received a corresponding one of the aligning tabs 10. The grooves 13 of all four fixing pieces 12 and the aligning tabs 10 of all holding plates 11 extend in radial direction relative to the axis A. The aligning tabs and the grooves are arranged in pairs on a common first diameter, while the two remaining tabs and grooves are arranged in pairs on a second common diameter offset in the peripheral direction exactly at 90° relative to the first diameter.

Both pairs of aligning units 9 effect a centering of the angle milling head 4 relative to the spindle carriage 1 and also hold the angle milling head in four predetermined and 90° spaced angular positions. In the case of temperature differences between the angle milling head 4 and the spindle carriage 1, the four aligning tabs 10 can move in a radial direction in the grooves 13 without influencing the centering effect in any manner. If the angle milling head 4 is to be arranged in a different angular position wih respect to the angle carriage 1, the clamping bolts must first be released, the angle milling head must be lowered slightly and then again be lifted into the desired angular position, after which the clamping bolts are again tensioned. In this manner, it is possible to index the angle milling head 4 in four angular positions with respect to the spindle carriage 1, which positions are each offset at 90° to one another in the peripheral direction.

In order to effect a camber adjustment, the angle milling head 4 must be pivoted at a small angle about the spindle axis A. Each of the fixing pieces 12 is for this purpose preferably constructed as a slide member movable in a housing 14 along guideways 15 having axes which are inclined at an angle $\alpha$ relative to the spindle axis A slightly in peripheral direction. That is, the axis of the guideways is oriented in planes parallel to and radially spaced from the plane containing the axis of the spindle axis. Each fixing piece or slide member 12 is hereby preferably constructed cylindrically and the guideway 15 is formed by an opening, the axis a of which is also slightly inclined in the peripheral direction at the angle $\alpha$ relative to the spindle axis. This inclination may for example be 1:100 (tan $\alpha = 0.01$) so that the angle $\alpha$ is approximately 35 minutes in size. An adjusting mechanism 16 is provided for the simultaneous engaging adjustment of each of all four slide members 12. The four adjusting mechanisms are coupled to one another in a manner which is not illustrated in detail so that all four slide members 12 can each be adjusted at equally large increments C. Each adjusting mechanism can, for example, be constructed hydraulically in that the slide member itself has a cylinder chamber. A piston is arranged in the cylinder chamber, which piston can be loaded on both sides. A piston rod is then fixedly connected to the spindle carriage through suitable intermediate elements. A movement of the slide members 12 can be controlled by suitable stops so that they each assume three different precisely defined positions. To achieve a stepless adjustment of the slide members, one could provide, also by using a doubly loadable piston, a shoulder on the slide member, which shoulder cooperates with an eccentric which serves as a stop. In place of an eccentric, it would also be possible to provide a wedge.

The operation of the described camber adjusting mechanism will be discussed in greater detail hereinafter in connection with FIGS. 2 and 3.

FIGS. 2 and 3 illustrate a milling tool 6 in full lines and in a position wherein the milling tool 6 does not have any cambered relation with respect to the workpiece surface 0. Thus in this case the milling tool axis B defines an angle of 90° with the surface 0 of the workpiece. FIG. 3 illustrates, for clarity purposes, an exaggeration of the angle of inclination α of the slide member axis a relative to the spindle axis A of the spindle 1. If the slide member 12 is moved upwardly an increment C relative to its solid line center position by means of the adjusting mechanism, then the groove 13, as one can recognize from FIG. 3, moves simultaneously at the increment c to the left. At an angle α of 35 minutes, which corresponds with an inclination of 1:100, the path of adjustment c in peripheral direction is exactly 100 times smaller than the path of adjustment C in axial direction.

Since all slide members 12 are moved simultaneously at an increment C upwardly and thereby all grooves 13 move an increment c in peripheral direction, the angle milling head 4 is rotated in peripheral direction U (FIG. 2) through the increment c. This amount c has, for example, at a path of adjustment C equal to 1.8 mm. the size of 0.18 mm. The angle milling head 4, the milling tool axis B and the milling tool 6 assume then the position which is illustrated in dash-dotted lines in FIG. 2. It is understood, that prior to the camber adjustment, the above-mentioned clamping bolts are released and after the camber adjustment are again placed into a clamping or locked position. Upon a reversal of the milling direction, after releasing the clamping bolts, all slide members 12 are moved into their lower terminal position and in this manner a camber in the opposite direction is achieved. The clamping bolts are subsequently again moved into their clamping position. A centering of the angle milling head 4 relative to the spindle axis A is always maintained during these camber adjustments.

If no camber adjustment is desired, it is also possible to construct the fixing pieces 12 as fixing plates 12a (FIG. 4), each having a groove 13 therein. The fixing plates are fixedly connected to the spindle carriage 1.

Figure 5:
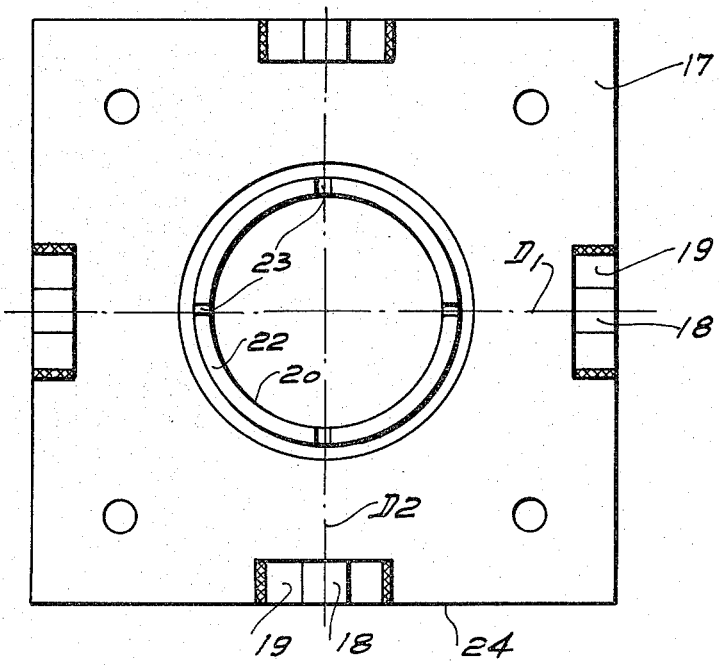
FIG. 5 is a top view of the aligning plate.

The condition enabling the new centering and indexing apparatus to function with the desired exactness is that the fixing pieces 12,12a are secured with great precision to the spindle carriage 1. This is preferably done with the help of the hereinafter described aligning plate which is illustrated in FIGS. 4 and 5.

The aligning plate 17 has aligning tabs 18 which are offset at 90° to one another in the peripheral direction.

The aligning tabs are also arranged on holding plates 19. The holding plates 19 are fixedly connected to the aligning plate 17. The aligning plate 17 has furthermore a centering opening 20 in its center which fits onto the free end 2 of the not fully illustrated spindle. In order to achieve here a clearance-free fit and to balance manufacturing tolerances, the centering plate 17 has in the region of the centering opening 20 and at a small distance therefrom an annular groove 21, which is arranged concentrically with respect to the centering opening 20. The annular land 22 which remains between the opening 20 and the annular groove 21 is provided with several axially extending slots 23. The annular land 22 forms in this manner an elastic expansion sleeve.

Two aligning tabs 18 are arranged on the aligning plate 17 in such a manner that they lie on a common diameter D1 of the centering opening 20. The aligning plate 17 has furthermore an aligning surface 24, which extends parallel with respect to the diameter D1 and parallel with respect to the axis of the aligning opening 20. The two other aligning tabs 18 are also arranged on a common diameter D2 extending precisely perpendicularly with respect to the first diameter D1.

To mount the centering pieces on the spindle carriage 1, the aligning plate 17 is moved with its centering opening 20 onto the spindle end 2. Since the centering opening 20 forms the inside diameter of an expansion sleeve, tolerances are hereby balanced and the aligning plate 17 is therewith precisely centered with respect to the spindle axis A. In order to also now be able to align the aligning plate 17 parallel or perpendicular with respect to a coordinate axis of the machine, the aligning surface 24 is provided. The aligning plate 17 can be rotated around the spindle axis A until its aligning surface 24 is aligned exactly with an aligning surface which is provided on the spindle carriage. The aligning surface which is provided on the spindle carriage can, for example, be formed by the guide bars or guideways on the spindle carriage. The aligning plate 17 is subsequently fixedly secured to the spindle carriage 1 by means of the screws 25. The fixing pieces 12a are then positioned with their grooves 13 onto the aligning tabs 18 and subsequently pinned and fixedly secured to the spindle carriage 1. If one uses the same aligning plate 17 in different machines, it is assured that all fixing pieces 12a assume the same position both in peripheral direction and also with respect to one of the coordinates of the machine. This is a basic condition for being able to use one and the same angle milling head or also other additional aggregates, which are equipped with corresponding aligning tabs, on difference machines. The alignment of the aligning tabs on the angle milling heads or on other additional aggregates can occur either on milling machines, the fixing pieces of which have been positioned and aligned earlier in the prescribed manner by means of the aligning plate, or by means of a second aligning plate, which has individual grooves which correspond with the projecting aligning tabs. These grooves which are then arranged on corresponding holding plates can, similarly as it was described earlier in connection with the spindle carriage, also be mounted exactly with the help of the aforedescribed aligning plate.

In order that the high milling forces generated during a milling operation are transmitted securely by the angle milling head 4 or other additional aggregates onto the spindle carriage 1 and a change of the aligning elements does not occur, in the case of spindle carriages without camber adjustment, the fixing pieces 12a and in the case of spindle carriages with camber adjustment, the slide member housings 14 are preferably arranged in recesses 1a on the spindle carriage and are fixed by lining with a shrinkage-free hardened plastic mass 26. The milling forces are then transmitted both through the fastening screws of the fixing pieces or the slide member housings and also through the mentioned plastic mass.

If a repair becomes necessary, the fixing pieces 12a or the slide member housings 14 can be removed and repaired without any damage to the plastic mass, the fixing pieces 12a or the slide member housings 14 are preferably, in cross section, perpendicular with respect to the spindle axis A and conically tapered from outside to the inside toward the spindle axis. Prior to lining with the plastic mass, the fixing pieces or the slide member housings are coated with a separation lacquer. After the repair has been completed, the fixing pieces or slide member housings can again be inserted accurately with respect to fit into the plastic mass.

Supplementary it is mentioned that the aligning surface of the aligning plate in the case of an already existing machine table or a movable machine portal corresponding with DIN 66 217 can be aligned according to the table or portal transport axis X.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A apparatus for the centering an indexing of the mating surfaces on a milling head on a spindle carriage of a milling machine, said spindle carriage having a spindle rotatably mounted thereon about an axis, comprising:

centering means on one of said spindle carriage and said milling head and including four identical upstanding aligning tabs and first mounting means for fixedly securing said aligning tabs to one of said spindle carriage and said milling head at 90° spaced intervals around the periphery of said mating surface of said one of said spindle carriage and said milling head, each of said aligning tabs having a finite width dimension;

centering and indexing means on the other of said spindle carriage and said milling head and including four identical aligning units and second mounting means for fixedly securing said aligning units to the other of said spindle carriage and said milling head at the same spacing as said aligning tabs around the periphery of said mating surface of the other of said spindle carriage and said milling head so that each of said aligning units is aligned with an associated one of said aligning tabs, said aligning units each including an elongated guideway and an elongated slide member reciprocally slidable in said guideway toward and away from said aligning tab, the axis of each of said guideways being inclined in the same peripheral direction relative to said mating surfaces and being out of parallel relation to said axis of said spindle, each of said slide members having a groove therein with a finite width dimension snugly accommodating said finite width of said aligning tab therein so that forces developed during a machining operation are transmittable from said milling head through said aligning tabs and said aligning units to said spindle carriage, whereby said milling head is centered relative to said spindle carriage;

means for effecting a simultaneous adjusting movement of each of said four slide members at least one of toward and away from an associated one of said aligning tabs to alter the positioning of said milling head on said spindle carriage; and releasable clamping means for releasably clamping said milling head to said spindle carriage.

2. The apparatus according to claim 1, wherein each slide member is constructed cylindrically and said guideway thereof is formed by an opening in said spindle carriage, the axis (a) of which opening is slightly inclined in said peripheral direction with respect to the spindle axis (A).

3. The apparatus according to claim 1, wherein for aligning said aligning units there is provided an aligning plate which has four aligning tabs thereon which are offset at 90° to one another and are received into said grooves of aligning units, a centering opening which fits onto an end of said spindle and an aligning surface which is arranged parallel to an axis of said centering opening and parallel to a diameter (D1) which extends through two diametrically oppositely positioned aligning tabs on said aligning plate.

4. The apparatus according to claim 3, wherein said aligning plate has in the region of the centering opening and at a small distance from same a concentric annular groove, wherein an annular land is provided between said centering opening and said annular groove and which has several slots therein which extend in the axial direction of said centering opening.

* * * * *

UNITED STATES PATENT AND TRADEMARK OFFICE
CERTIFICATE OF CORRECTION

PATENT NO. : 4 384 811
DATED : May 24, 1983
INVENTOR(S) : Rolf Eckstein and Horst Schramm It is certified that error appears in the above-identified patent and that said Letters Patent is hereby corrected as shown below:

Col. 7, line 36; change "A" to ---An---.
Col. 7, line 36; change "an" to ---and---.
Col. 8, line 32; change "thereof" to ---therefor---.

Signed and Sealed this

Twenty-third Day of August 1983

[SEAL]

Attest:

GERALD J. MOSSINGHOFF

Attesting Officer  Commissioner of Patents and Trademarks